United States Patent
Van Alsten (10) Patent No.: US 6,299,983 B1
(45) Date of Patent: Oct. 9, 2001

(54) DERIVATIZED METALLIC SURFACES, COMPOSITES OF FUNCTIONALIZED POLYMERS WITH SUCH METALLIC SURFACES AND PROCESSES FOR FORMATION THEREOF

(75) Inventor: John Gregg Van Alsten, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/192,685

(22) Filed: Nov. 16, 1998

Related U.S. Application Data (63) Continuation-in-part of application No. 09/102,230, filed on Jun. 22, 1998, now abandoned.
(60) Provisional application No. 60/051,116, filed on Jun. 27, 1997, and provisional application No. 60/061,977, filed on Oct. 16, 1997.

(51) Int. Cl.[7] .................................................. C23C 22/23
(52) U.S. Cl. ...................... 428/470; 428/458; 428/472.3; 106/14.12; 106/14.21; 106/14.44; 148/250; 148/253; 148/269; 252/389.2
(58) Field of Search .................................... 428/458, 409, 428/470, 472.3, 457; 148/250, 253, 254, 269; 106/14.12, 14.21, 14.44; 252/389.21, 389.2

(56) References Cited

U.S. PATENT DOCUMENTS

| | | | |
|---|---|---|---|
| 3,770,514 | 11/1973 | Wystrach | 148/6.15 R |
| 3,803,047 | 4/1974 | Hwa | 252/389 |
| 3,803,048 | 4/1974 | Hwa | 252/389 |
| 3,925,455 | * 12/1975 | Maier | 562/20 |
| 4,024,103 | 5/1977 | Heinrich et al. | 260/45.7 P |
| 4,209,487 | 6/1980 | Hogue et al. | 422/12 |
| 4,352,696 | 10/1982 | Prather | 106/163 |
| 4,777,091 | 10/1988 | Dettloff et al. | 428/418 |
| 4,788,176 | 11/1988 | Wieserman et al. | 502/401 |
| 4,994,429 | 2/1991 | Wieserman et al. | 502/401 |
| 5,059,258 | 10/1991 | Wefers et al. | 148/272 |
| 5,124,022 | * 6/1992 | Evans, II et al. | 205/175 |
| 5,132,181 | 7/1992 | Wefers et al. | 428/457 |
| 5,487,792 | 1/1996 | King et al. | 136/256 |
| 5,547,761 | 8/1996 | Chapman, Jr. et al. | 428/422 |

FOREIGN PATENT DOCUMENTS

| | | |
|---|---|---|
| 44 43 032 A1 | 6/1996 | (DE) . |
| 0 382 224 A2 | 8/1990 | (EP) . |
| 2 084 128 A | 4/1982 | (GB) . |
| 2 317 177 A | 3/1998 | (GB) . |
| WO 87/01988 | 4/1987 | (WO) . |
| WO98/29580 | 7/1998 | (WO) . |
| WO 98/48075 | 10/1998 | (WO) . |

OTHER PUBLICATIONS

Yang, Huey C., Growth and Characterization of Metal(II) Alkanebisphosphonate Multilayer Thin Films on Gold Surfaces, J. Am. Chem. Soc., 1993, 11855–11862, 115 (No month).

Allara, D.L. et al., Formation of a Crystalline Monolayer of Folded Molecules by Solution Self–Assembly of α,ω–Alkanedioic Acids on Silver, J. Am. Chem. Soc., 113, 1852–1854, 1991 (No month).

(List continued on next page.)

*Primary Examiner*—Blaine Copenheaver
*Assistant Examiner*—Stephen Stein (57) ABSTRACT

This invention provides for metal surfaces which when derivatized with α-ω bis-functionalized substantially linear aliphatic, including fluoroaliphatic acids and metal salts thereof exhibit changes in surface properties. In particular, composites formed from polymers and metallic surfaces derivatized according to a process of the present invention exhibit surprising durability.

32 Claims, 2 Drawing Sheets

OTHER PUBLICATIONS

Xiao–Hong Xu et al., *J. Am. Chem. Soc.*, 116, 8386–8387, 1994 (No month) Immobilization of DNA on an Aluminum (III) Allcanebisphosphonate thin film with Electrogenerated Chemiluminescent Detection.

Andrezej J. Szyprowski, *Ochr. Koroz.*, 36, No. 2, 28–34, 1993 (No month) Mechanism of Action of Phosphonic Acids During Formation of Protective Layers on Metals—Literature Review.

T.M. Putvinski et al., *Langmuir*, 6, 1567–1571, 1990 (No month) Self–Assembly of Organic Multilayers with Polar Order Using Zirconium Phosphate Bonding Between Layers.

M. A. Morsi et al., *Werkstoffe und Korrosion*, 31, 108–114, 1980 (No month) The Inhibition of the Ion Corrision in Aqueous Solutions Containing Oxygen.

W. Paatsch, *Werkst Korros*, 109–121, 1980 (No month) Inhibition of Localized Corrosion by Phosphonic Acid Derivatives.

G. D. Davis et al., *Journal of Materials Science*, 20, 975–988, 1985 (No month) Use of hydration inhibits to improve band durability of aluminum adhesive joints.

L. J. Matienzo, *Journal of Materials Science*, 21, 1601–1608, 1986 (No month) Environmental and adhesive durability of Aluminum–Polymer–Systems Protected with Organic Corrosion inhibitors.

D. L. Allara et al., *J. Chem. Soc.*, 113(5), 1852–1854, 1991 (No month) Formation of Crystalline Monolayer of Folded Molecules by Solution Self–Assembly of DC–W–Alleanodioic on Silver.

Marc D. Porter et al., *J. Am. Chem. Soc.*,109, 3559–3568, 1987 (No month) Spontaneously Organized Molecular Assemblies. 4. Structural Characterization of n–Alkyl Thiol Monolayers on Gold by Optical Ellipsometry, Infrared Spectroscopy.

Huey C. Yang et al., *J. Am. Chem. Soc.*, 115, 1993 (No month) Growth and Characterization of Metal(II) Alwavebisphosphate Multilayer Thin Films on Gold Sulfates.

D.A. Hardwick et al., *Journal of Materials Science*, 19, 223–232, 1984 (No month) Environmental durability of aluminum adhesive joints protected with hydration inhibitors.

* cited by examiner

DERIVATIZED METALLIC SURFACES, COMPOSITES OF FUNCTIONALIZED POLYMERS WITH SUCH METALLIC SURFACES AND PROCESSES FOR FORMATION THEREOF

This application is a continuation-in-part of U.S. Application Ser. No. 09/102,230, filed Jun. 22, 1998, now abandoned, which claims priority benefit of U.S. Provisional Application 60/051,116, filed Jun. 27, 1997 and U.S. Provisional Application 60/061,977, filed Oct. 16, 1997.

BACKGROUND OF THE INVENTION

This invention provides for metal surfaces which are derivatized when treated with α-ω bis-functionalized substantially linear aliphatic, including fluoroaliphatic, acids or salts thereof. These derivatized metal surfaces exhibit changes in surface properties. In particular, composites formed from polymers and metallic surfaces derivatized according to a process of the present invention exhibit surprising durability.

Wystrach (U.S. Pat. No. 3,770,514) discloses the application of diphosphine oxide derivatives to a metal surface followed by application of a coating to the so-treated surface. The coatings disclosed are paints and adhesives. Wystrach further discloses that a metallic surface treated first with an inorganic chromate and then the diphosphine oxide derivative exhibits enhanced corrosion resistance over prior art treatments. Wystrach's diphosphine oxide derivatives encompass structures containing up to four-carbon chains between phosphine groups, and a number of pendant groups on the phosphorus including hydroxy and hydroxyalkyl, with methylene bis[bis(hydroxymethyl) phosphine oxide] as the preferred species.

Hwa (U.S. Pat. No. 3,803,047 and U.S. Pat. No. 3,808,048) discloses compositions consisting essentially of certain alkylene polyphosphonic acids and a water-soluble zinc salt, and compositions consisting essentially of alkylene polyphosphonic acids and certain azole compounds and/or a water-soluble zinc salt. Ethanol 1,1-diphosphonic acid is disclosed as a preferred polyphosphonic acid.

Dines et al. (WO 87/01988) disclose "multi-layer structures" wherein a polymer composite layer is secured to certain metallic or polymeric substrates. The polymer composite layer is composed of a polymer selected from certain groups of polymers, and a particulate, layered compound selected from the group consisting of $M(O_3ZO_xR)_n$ compounds, as defined therein, preferably $M(O_3PR)_2$ or $M(O_3POR)_2$. The particulate, layered compound may be tailored to be compatible with the polymer and provide adhesion between such polymer and the substrate. The particulate, layered compound may be composited on the surface of the polymer, or homogeneously dispersed throughout the polymer.

Detloff et al. (U.S. Pat. No. 4,777,091) disclose the use of aminophosphonic acids, preferably multi-phosphonic acids, to prime surfaces of steel or galvanized metal, to take polyether resin-based coatings. The compositions taught are all relatively short-chain molecules, while long chain and branched molecules are disclosed. Detloff et al. are silent in regard to other types of coatings. Further, Detloff et al's teachings make no distinctions regarding chain lengths, degree of branching, or the desirability of αω diacids.

Wieserman et al. (U.S. Pat. No. 4,994,429) disclose the use of organic acid molecules, at least one end of which is a phosphorus-containing acid group, to form "active layers" on metal oxide/hydroxide particles to form active material. R groups linking the phosphorus-containing acid group to an unreacted group contain 1–30 carbon atoms. Uses of the active material disclosed include among others adsorbents and promoters for adhesive bonding, ceramics, and polymers. Wieserman is silent in regard to use of metals as substrates. Nothing is taught therein about any effects of chain length, and their examples are confined to relatively short chain lengths. There is no mention of neutralizing the "active" free acid end to generate binding sites for acid polymers.

Allara et al. (J. Am. Chem. Soc. Vol. 113, No. 5, p. 1852, 1991) disclose the treatment of metallic surfaces using an α-ω dicarboxylic acid having a carbon chain length of 30 carbons. The linear molecule is said to bend so that both ends of the chain contact the metallic surface, leaving the hydrocarbon backbone to impart a hydrophobic character to the surface so formed.

It is generally known in the art of forming self assembled monolayers of alkane thiols on gold that there is a transition from disordered to ordered molecular monolayers which occurs with increasing chain length (J. Am Chem. Soc., Vol. 109 (12) p. 3559, 1987). Yang et al (J. Am. Chem. Soc., Vol. 115 (25), p. 11855, 1993) teach that the degree of order of the backbone chains in metal alkyl bis(phosphonate) solids increases with chain length approaching a maximum when the chain is at least 11 carbon units long. The relative degree of organization is inferred from the location of $CH_2$ bond stretches in the infrared spectrum of the material, which is said to shift to lower wavenumber with increasing organization. However, there is no teaching in that art to treat metallic surfaces to achieve improved adhesion of coatings, polymer films, or for improved corrosion resistance.

SUMMARY OF THE INVENTION

The present invention provides a process for producing a derivatized metal surface, comprising contacting a metal surface with an α-ω difunctional substantially linear aliphatic or fluoroaliphatic acid, or a salt thereof, having at least 8 atomic linkages in the aliphatic or fluoroaliphatic chain. The process may further comprise subsequent contact with one or more functional molecules, such as via a solution comprising a multivalent metallic salt, a liquid comprising a polymer having a functional group associative with said derivatized metal surface, or a non-polymeric molecular species having a functional group associative with said derivatized metal surface.

The present invention also provides a process for applying a polymer coating onto a surface of a metal substrate, comprising contacting an α-ω difunctional substantially linear aliphatic or fluoroaliphatic acid, or a salt thereof, having at least 8 atomic linkages in the aliphatic or fluoroaliphatic chain with a liquid comprising a polymer having a functional group associative with said difunctional acid or salt thereof to form a mixture, and coating the mixture onto a surface of a metal substrate.

The present invention further provides a layered structure comprising: a first layer comprising a substrate having a surface, said substrate comprising a metal and a plurality of cations thereof on the surface; and a second layer comprising an α-ω difunctional substantially linear aliphatic or fluoroaliphatic bidentate radical having at least 8 atomic linkages in the aliphatic or fluoroaliphatic chain, the radical having a first end and a second end, said first end being bonded to an anion of an oxy-acid, said anion being ionically bonded to the metal cations on the surface of said substrate, and said second end being bonded to a functional group.

The present invention further provides a composition comprising an α-ω difunctional substantially linear aliphatic or fluoroaliphatic acid, or a salt thereof, having at least 8 atomic linkages in the aliphatic or fluoroaliphatic chain, and a polymer having a functional group associated with said acid or salt thereof.

DETAILED DESCRIPTION

The present invention provides a metallic surface having a particular desired functionality imparted thereto, such as catalytic activity, low or high surface energy, selective reactivity, corrosion resistance, or the like.

Figure 1:
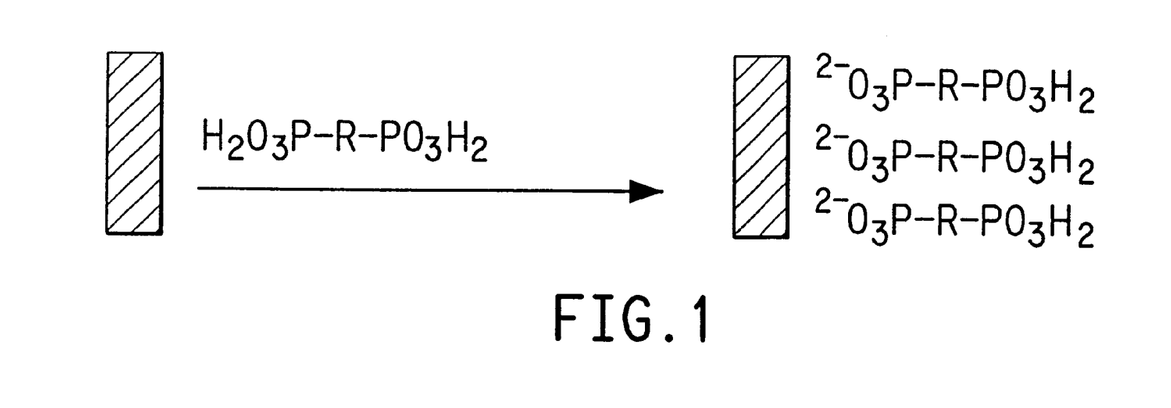
FIG. 1 shows a derivatization of a metal surface with a representative α-ω difunctional substantially linear aliphatic acid.

In a process of the present invention, a first derivatized metal surface is formed by contacting a metal surface with an α-ω difunctional substantially linear aliphatic or fluoroaliphatic acid, or a salt thereof, having at least 8 atomic linkages in the aliphatic or fluoroaliphatic chain, the metal surface being reactive with the acid or salt moiety, said acid or salt moiety being the a functional group of said α-ω difunctional species (see FIG. 1). Depending upon the chemical identity of the ω functionality of said α-ω difunctional species, the first derivatized metal surface is receptive via complexation to other molecules having a functional group, such as amine end groups on polyamides, organic and inorganic metal salts, ion-containing polymers (known as ionomers), or acids such as the pendant acid groups of polymethacrylic acid. Thus, through contact with these other functional molecules, the first derivatized metal surface can be further derivatized. The first derivatized metallic surface can be further contacted with one functional molecule, or for certain embodiments herein the first derivatized metal surface is further contacted with more than one functional molecule. The functional molecule is described herein as having a functional group "associative" or "associated" with the first or second derivatized metal surface. By "associative" or "associated" is meant that the functional molecule via its functional group is capable of complexing with the derivatized surface. This can take the form of an ionic bond or a hydrogen bond or any other form of association or complexing known to those of skill in the art.

Figure 2:
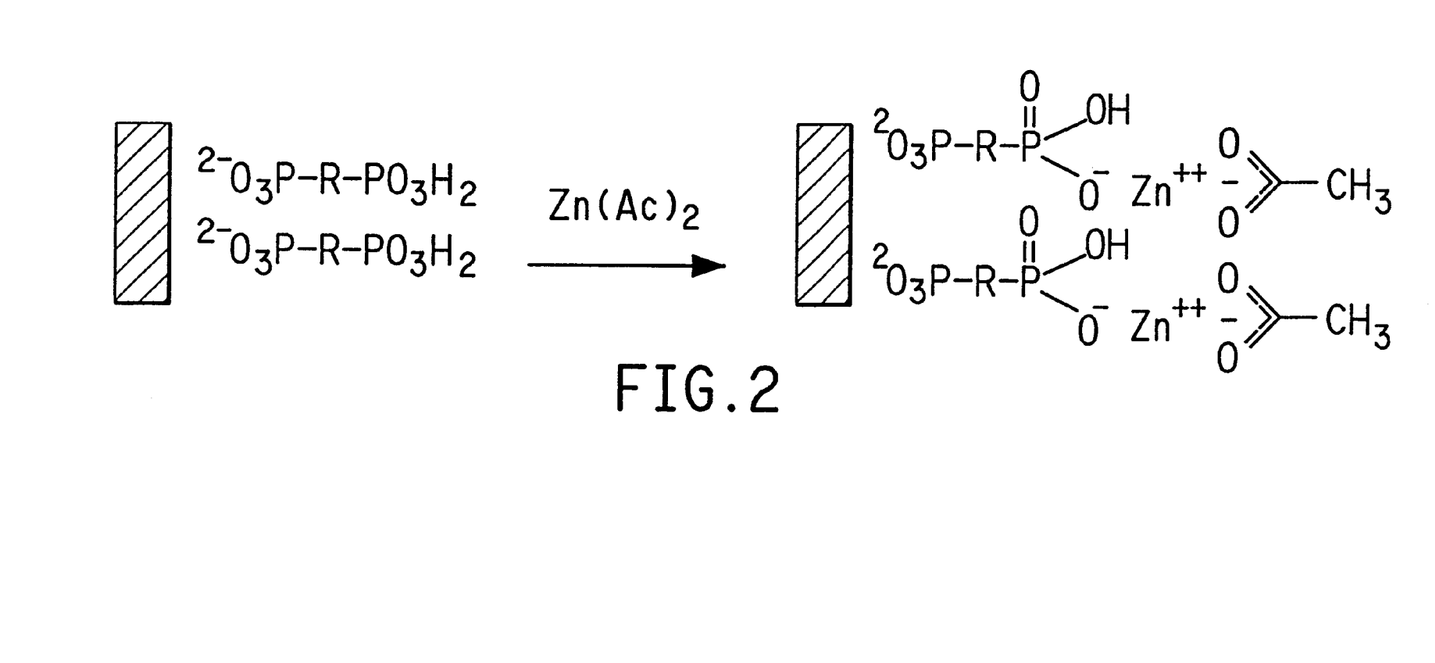
FIG. 2 shows a further derivatization of a metal surface with a representative multivalent metallic salt.
Figure 3:
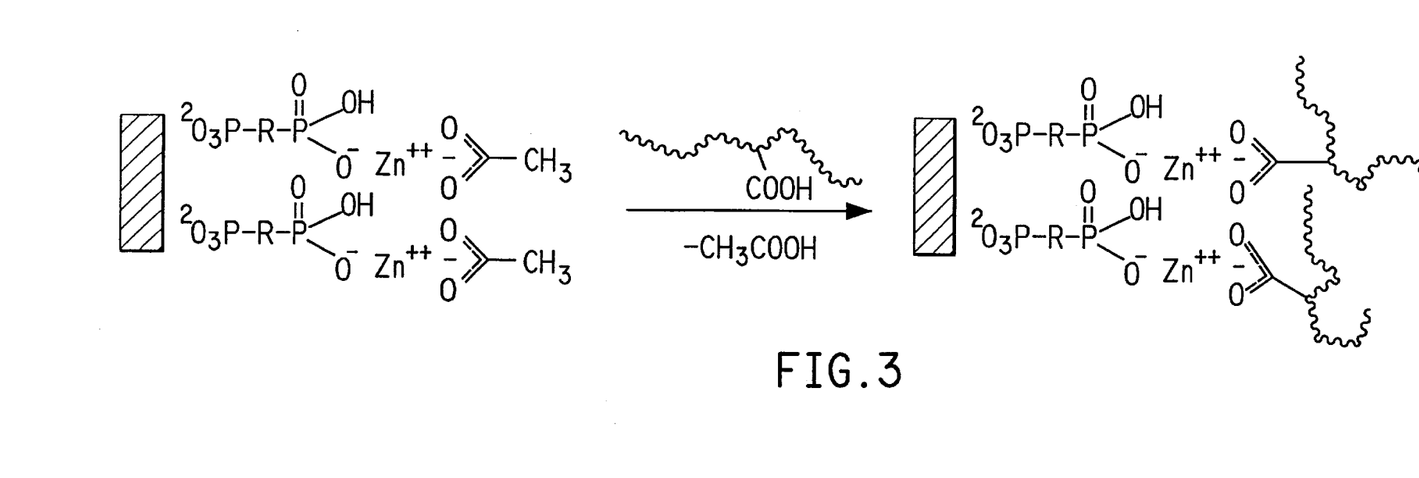
FIG. 3 shows contacting a representative polymer having a functional group with the derivatized surface of FIG. 2.

In a further embodiment of the present invention, a second derivatized metal surface is formed by contacting the first derivatized metal surface, wherein the α-ω difunctional substantially linear aliphatic or fluoroaliphatic acid or salt thereof is preferably a bis-oxyacid of phosphorus or a univalent salt thereof, with a solution comprising a multi-valent metal salt thereby forming an ionic complex on the metal surface (see FIG. 2). Like the first derivatized metal surface, the second derivatized metal surface, too, is receptive via complexation to a variety of other functional molecules particularly acids. For both the first and second derivatized metal surfaces, it is the α end of the α-ω species that forms an anion group ionically bound to cations formed from the metal surface, while the ω end exhibits the receptivity to association with certain other functional molecules (see FIGS. 3–4).

In yet a further embodiment of the present invention, a third derivatized metal surface is formed by contacting either the first or second derivatized metal surface with a liquid comprising a polymer having a functional group associative with the free end of the anion of the first or second derivatized metal surface, to form a novel layered structure comprising the reaction product of the first or second derivatized metal surface of a metal substrate and the polymer having a functional group associative with the first or second derivatized metal surface. A representative example of a polymer having a functional group suitable for use in forming the third derivatized metal surface is a carboxylic acid functionalized copolymer of tetrafluoroethylene and hexafluoropropylene (see FIG. 3).

Figure 4:
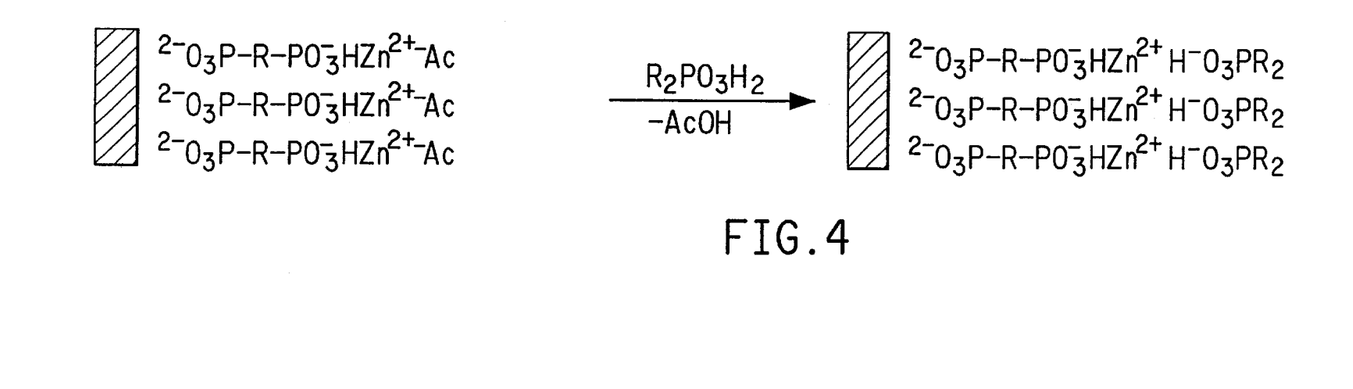
FIG. 4 shows contacting a representative non-polymeric organic species having a functional group with the derivatized surface of FIG. 2.

In an alternative embodiment of the present invention, a fourth derivatized metal surface is formed by contacting either the first or second derivatized metal surface with a non-polymeric molecular species having a functional group associative with the first or second derivatized metal surface, to form a novel layered structure comprising the reaction product of the first or second derivatized metal surface of a metal substrate with the non-polymeric molecular species (see FIG. 4). Representative examples of non-polymeric functionalized molecular species suitable for use in forming the fourth derivatized metal surface are octadecylphosphonic acid, perfluorooctanoic acid, and Zonyl®-UR fluorinated surfactant, a registered trademark and available from E. I. du Pont de Nemours and Company (DuPont), Wilmington Del.

The α-ω difunctional substantially linear aliphatic or fluoroaliphatic acids or salts thereof suitable for the processes of the present invention can be represented by the formula:

$$\alpha\text{-R-}\omega$$

wherein:

α is a functional group selected from the group consisting of: radicals of oxyacids of phosphorous, sulfur, and carbon, and salts of a counterion (or cation) thereof, provided that oxyacids of sulfur are not used when R is fluorinated;

ω is a functional group selected, independently of α, from the group consisting of: radicals of oxyacids of phosphorous, sulfur, and carbon, and salts of a counterion (or cation) thereof; primary, secondary, tertiary or quaternary amines and the salts thereof; phenol; oxamnic acid; amino acid; and carbon and sulfur zwitterion, provided that oxyacids of sulfur are not used when R is fluorinated; and R is an α-ω bidentate substantially unbranched aliphatic or fluoroaliphatic organic radical having at least 8 carbons, preferably at least 10 carbons, in a linear chain between radical ends wherein less than 50%, preferably less than 25%, most preferably less than 10%, of the carbon atoms in the chain are replaced by oxygen, nitrogen, or sulfur. For the fluoroaliphatic radicals, one or more hydrogens of an aliphatic organic radical are replaced by a fluorine. R can be a perfluorinated organic radical.

Preferably ω is a radical of an oxyacid of phosphorous, carbon, or sulfur, or a salt thereof. More preferably α and ω are the same radical of an oxyacid of phosphorous or a salt thereof. Representative examples of oxyacids of phosphorous are phosphonic acids, such as Q—P(=O)(—OH)$_2$ and (Q—)(TO—)P(=O)(—OH)); phosphinic acids, such as (Q—)(Q—)P(=O)(—OH)); and phosphates, such as T—O—P(=O)(—OH)$_2$) wherein each Q is independently selected from the group consisting of: H, halogen, alkyl and aryl, and each T independently selected from the group consisting of: alkyl or aryl. Most preferably, α and ω are a radical of an α-ω bisphosphonic acid or a univalent salt thereof.

The aliphatic or fluoroaliphatic organic radical, R, is preferably an unbranched hydrocarbon or fluorocarbon chain. The chain length suitable for the practice of the present invention ranges from 8 to fewer than 30 carbon (or carbon replacement) atoms. The most preferred chain lengths are from 10–18 carbon atoms.

Preferred fluoroaliphatic acids are perfluorinated dicarboxylic acids, and fluorinated phosphonic or phosphinic acids or fluorinated phosphates in which a substantially fluorinated group or perfluorinated group of the phosphonic acid, phosphinic acid or phosphate is bonded on both ends to a —(CH$_2$)— or —(CH$_2$CH$_2$)— group, i.e., these —(CH$_2$)— or —(CH$_2$CH$_2$)— groups are adjacent to the terminal α-ω functional groups. Certain fluoroaliphatic acids are commercially available Others can be prepared as shown in the example section below. Most preferred fluoroaliphatic acids are $(CF_2)_n$—$((CH_2)_m OP(O)(OH)_2)_2$ wherein n is 6–10 and m is 1 or 2.

It is found in the practice of the present invention that the metallic surfaces treated with certain aliphatic acids or salts thereof degrade by 77% after 30 minutes in air at a temperature of 250° C. The metallic surfaces treated with certain fluoroaliphatic acids or salts thereof were found to degrade by only 6% under identical conditions. The rate of degradation for the fluorinated aliphatic monolayer was found to be lower at 350° C. than that of the fully hydrogenated aliphatic monolayer at 250° C. For example, the first order rate constant for thermal degradation of a metal surface treated with 1,12-dodecyl bisphosphonic acid (DBPA) was found to be 0.103 min$^{-1}$ at 250° C., while for a surface treated with $H_2O_3POCH_2(CF_2)_{10}CHOPO_3H_2$ the rate was 0.019 min$^{-1}$ at 350° C. Thus, where thermal stability of the treatment is a concern, the use of an α-ω difunctional substantially linear fluoroaliphatic acid or salt thereof is preferred.

While in no way limiting the scope of the invention, the following theoretical description provides a useful framework for understanding the underlying principles which govern the invention hereindescribed. It is believed that the underlying cause of the surprising improvements offered by the practice of the present invention, and as hereinbelow exemplified, is the formation of so-called self-assembled molecular monolayers on the base metal surface by the α-ω difunctional substantially linear aliphatic or fluoroaliphatic acid or salt thereof suitable for the process of the present invention, wherein an acidic or ionic group at one end (a first end) of the aliphatic or fluoroaliphatic acid or salt thereof ionically bonds the acid or salt to cations of the metal surface. By "self-assembled monolayers" is meant assemblies of molecules bound to the surface of a substrate that are precisely one molecule thick and are formed spontaneously by contacting the substrate with a liquid comprising the assembling molecule. It is further believed that the self-assembled molecular monolayer so formed is characterized by the morphology indicated in FIG. 1, wherein the substantially linear molecules are aligned in the manner shown, thereby forming a new surface with the character imparted by the functional group on the free (or a second) end of the molecule, in the case of FIG. 1, an acid. It is believed that the desirable features of the present invention derive from the high density of functional groups, and the high degree of crystallinity which is obtained upon the creation of the self-assembled monolayer.

Metal surfaces suitable for the practice of the present invention are materials which exhibit chemical reactivity with at least one of the functional groups α or ω hereinabove described. Suitable metal substrates having a metal surface useful in the processes and layered structures of the present invention include iron, chromium, aluminum, copper, nickel, zinc, titanium, tin, tantalum, and alloys thereof such as steel, stainless steel, brass, inconel, and phosphated metals. Preferred for the practice of the present invention are steel, phosphated steel, galvanized steel, stainless steel, aluminum, brass, tantalum and copper.

Using infrared analytical techniques known in the art (Yang et al., J. Am. Chem. Soc. Vol. 115 (25) p. 11855, 1993.), it is found that repeated application of the process of the present invention employed for the formation of the first derivatized metal surface and hereinbelow described, results in the formation of multiple molecular monolayer structures. It has been found in the practice of the present invention that when copper-containing metals are contacted according to the process of the invention multiple monolayers form spontaneously during a single exposure. By "multiple monolayers" are meant materials comprising alternating layers of the α-ω bisfunctional organic molecule and the coordinating metal cation used to prepare the second derivatized metal surface, in which the number of α-ω bisfunctional organic molecule layers is greater than one. Although the number of molecule layers is greater than one, it is believe that together all of the alternating layers of the α-ω compound and the coordinating metal cation are one molecule.

In a preferred embodiment of the process of the present invention, the first derivatized metal surface is formed by contacting a metal substrate having a metal surface with a solution comprising an α-ω difunctional substantially linear aliphatic or fluoroaliphatic acid, or a salt thereof, having at least 8 atomic linkages in the aliphatic or fluoroaliphatic chain, preferably an α-ω bis-oxyacid of phosphorus or a univalent salt thereof, most preferably an α-ω bis phosphonic acid or a univalent salt thereof, followed by rinsing of the thus contacted surface with the acid-free solvent (see FIG. 1). Suitable contacting time depends upon the concentration of acid in the solvent, the nature of the solvent, the temperature, and the receptivity of the metal. For example, it has been found in the practice of the present invention that satisfactory results are achieved by contacting a stainless steel surface with a 1 millimolar solution of the acid, 1, 12 dodecyl bisphosphonic acid, in ethanol for 15 minutes at room temperature.

It is further found in the practice of the present invention for the formation of the first derivatized metal surface that the un-neutralized oxyacids of phosphorous, preferred for the practice of the invention, are essentially insoluble in water. Ethanol is a preferred solvent for the practice of the invention. Most preferred are 0.1–1.0 mM solutions of 1,10 decyl bis-phosphonic acid or 1,12 dodecyl bis-phosphonic acid in a one-half acid equivalent solution of a monovalent hydroxide, preferably sodium hydroxide or ammonium hydroxide in water. It is found that undesired precipitation results if a multivalent ion is employed during preparation the first derivatized metal surface, and for that reason, univalent ions are highly preferred for the practice of the invention.

In a particularly preferred embodiment of the invention, the first derivatized metal surface is formed using an am bisphosphonic acid, or a univalent salt thereof, followed by formation of the second derivatized metal surface by subsequent contacting of the first derivatized metal surface with a solution of a multivalent metal salt, whereby a multivalent metal phosphonate layer is formed on the metal surface rendering a surface with exceptional receptivity to acid-containing molecules (see FIG. 2). It has been found in the practice of the present invention that the first derivatized metal surface formed according to the preferred embodiment of the process of the invention when further contacted with a 1 mM aqueous solution of zinc acetate can be made to exhibit the desired improvement in surface receptivity to acid-containing molecules.

In principle, in the preferred embodiments of the invention, any ion having an oxidation state of +2 or greater which can form a solution with a solvent suitable for the practice of the invention is useful in forming the second derivatized metal surface of the present invention. Included are ions of alkaline earth and transition metals, as well as metals from groups IVA, VA, VIA, of the periodic table. Also included are complex ions with oxidation state of +2 or greater which form solutions with solvents suitable for the practice of the invention such as $VO^{+2}$. Preferably, the ions are multivalent and are soluble in water or ethanol. Most preferable are Zr, Zn, Pb, Al, Cr, Fe, Ni, Co, V, Sn, Os, Ce, Y, Yb, La, Mn, Mg, Cu, and Ca.

Solvents suitable for use in the processes of the present invention are liquids or liquid mixtures having pKa values higher than that of the $\alpha$-$\omega$ difunctional substantially linear acid or salt thereof (the monolayer forming solute). Suitable solvents for certain of the monolayer forming solutes can include acetic acid, tetrahydrofuran, alcohols, such as methanol, ethanol, and propanol, aliphatic hydrocarbons, ethers, esters, perhydrogenated carboxylic acids, aromatic liquids, dimethyl sulfoxide and neutralized solutions in water. Preferred solvents for bisphosphonic acids are aqueous solutions of monovalent hydroxides and alcohols. Preferred solvents for the a-co fluoroaliphatic acids are aqueous solutions of monovalent hydroxides. Solvents for these fluorinated materials can also be perfluorinated liquids such as perfluorinated tetrahydrofuran.

Most preferred for the process of forming the second derivatized metal surface of this invention are 1 mM solutions of zinc acetate in water or ethanol; metal nitrates such as aluminum nitrate, chromium (III) nitrate, cerium (III) nitrate and water; and lead (II) acetate and water.

There are no particular limitations in principle to the temperature at which the metallic surface is treated according to the process of the invention. In general, warmer temperatures are preferred for the formation of the first derivatized metal surface according to the preferred embodiment of the process of the invention. The maximum temperature at which the derivatized surfaces of the invention may be produced is largely determined by the liquids employed. As a general rule, the contacting temperature should be below the boiling point or the decomposition temperature of the liquid, whichever is lower. Thus, when water or ethanol are employed, it is preferred that the contacting temperature be in the range of about 20–100° C. When a polymer melt is employed, as in the formation of the third derivatized metal surface of the invention, the contacting temperature is in the range of about 5–300° C. Solvents having boiling points well above those of ethanol or water will also be suitable for the practice of the process of the present invention at temperatures below their boiling points.

While temperatures above room temperature are preferred for forming the first derivatized surface of the invention, the process for forming the second, third and fourth derivatized surfaces of the invention may at times be performed at room temperature.

The present invention further provides a layered structure comprising a first layer comprising a substrate having a surface, said substrate comprising a metal and a plurality of cations thereof on the surface; and a second layer comprising an $\alpha$-$\omega$ difunctional substantially linear aliphatic or fluoroaliphatic bidentate radical having at least 8 atomic linkages in the aliphatic or fluoroaliphatic chain, the radical having a first end and a second end, said first end being bonded to an anion of an oxy-acid, said anion being ionically bonded to the metal cations on the surface of said substrate, and said second end being bonded to a functional group. The $\alpha$-$\omega$ difunctional substantially linear aliphatic or fluoroaliphatic bidentate radical is as described above for "R", the anion of an oxy-acid is derived from "$\alpha$" as described above, and the functional group can be as described for "$\omega$" above.

The layered structure can further comprise derivatives of functional molecules bonded to said functional group or to a derivative of said functional group. Preferred derivatives of functional molecules are obtained from molecules such as multivalent metal salts, wherein the second layer is a cation of a bis-oxyacid of phosphorus or a salt thereof; and organic species, such as polymers and non-polymeric molecular species, which organic species are associated with said functional group, with a derivative of said functional group, or with a derivative of a combination of said functional group (or a derivative of said functional group) with the multivalent metal salt derivative. Representative ionic derivatives can be obtained from organic acids to form a third derivatized metal surface or a polymeric layered structure comprising such third derivatized metal surfaces. The reacting organic molecule can be small, such as can be used to form a fourth derivatized metal surface or a non-polymeric layered structure comprising such a fourth derivatized metal surface; or macromolecular, such as can be used to form the third derivatized metal surface or a polymeric layered structure comprising such a third derivatized metal surface; mono or polyacidic; or multifunctional in nature.

In an especially preferred embodiment of the invention, polymers are bonded to the metal surface by the intermediary action of the $\alpha$-$\omega$ difunctional substantially linear aliphatic or fluoroaliphatic acid or salt thereof of the present invention, to form the third derivatized metal surface or a layered structure comprising same. The polymer thus becomes a third layer. The polymers suitable for the practice of the invention are those which incorporate a functional group which can associate with the functional group residing on the free end (or second end) of the complex ionically bonded to metal cations of the metal surface of the first or second derivatized metal surface. Suitable for the practice of the invention are polymers and copolymers having oxyacid functionality, especially oxyacids of phosphorous, sulfur, and carbon, either in the backbone or in side groups, and their ionomers, including the homo- and co-polymers of acrylic acids and their ionomers, the homo and co-polymers of styrene sulfonate and their ionomers, the homo- and co-polymers of vinyl phosphonic acid and their ionomers, the homo- and co-polymers of vinyl sulfonic acid and their ionomers, the homo- and co-polymers of amic acids and their ionomers, and polymers having phosphorous, sulfur, or carbon oxyacid acid end groups (telechelics), either as free acid or in neutralized form (telechelic ionomers), including the telechleic homo- and co-polymers of: tetrafluoroethylene, styrenes, butadiene, and ethylene-propylene-diene rubbers. Other suitable polymers or co-polymers are those having an amine (primary, secondary, tertiary, and the salts of said amines) or anhydride functionality incorporated either in the polymer backbone, as a side group, or an end group. Polyimides can also be used as the polymer.

Preferred are polymers having oxyacid acid or anhydride functionality and polyimides.

The polymer-derivatized metal surface of the present invention, e.g. the third derivatized metal surface, (or the layered structure containing same,) can be formed by contacting the first derivatized metal surface, or the second derivatized metal surface wherein the α-ω difunctional compound used in forming the second derivatized metal surface is a bis-oxyacid or a salt thereof (see FIG. 3), (or layered structures containing same), with a liquid comprising a polymer, such as a solution, a dispersion, or a melt comprising the polymer, or a solid comprising the polymer in which the polymer subsequently undergoes at least partial melting. In one preferred embodiment, a solution comprising the polymer is applied to the first or second derivatized metal surface and subsequently dried at a temperature above the glass transition temperature of the polymer. In another preferred embodiment, the polymer is applied to the first or second derivatized metal surface as a melt. A preferred third derivatized metal surface (or layered structure comprising same) is a derivatized tantalum surface wherein the polymer is a polyimide.

In a further embodiment of the present invention small molecules with ion-forming functional groups are immobilized on surfaces forming the structure of the fourth derivatized metal surface hereinabove described or layered structures comprising same. For layered structures further comprising ionic derivatives of non-polymeric molecular species, the ionic derivative combines with the functional group ionically bonded to the α-ω compound or combines with the multivalent salt derivative of a second derivatized metal surface to become part of the second layer (see FIG. 4). Small molecules suitable for forming the fourth derivatized metal surface or layered structures comprising same of the present invention include molecules containing oxyacid functionality, especially oxyacids of phosphorous, sulfur, and carbon, either as the free acid or a neutralized salt, including oxamic acids, zwitterions, and amino acids, molecules containing amine functionality, either as the free amine or ammonium salt, and molecules containing phenolic functionality, either as the free acid or salt.

Preferred are molecules containing oxyacid functionality, especially oxyacids of phosphorous, sulfur, and carbon, either as the free acid or a neutralized salt, including oxamic acids, zwitterions, and amino acids.

In an alternative embodiment of the invention, wherein it is desired to apply a durable coating of a polymeric material onto a surface of a metal substrate, the benefits derived from the practice of the present invention can be realized by contacting, either prior to or simultaneously with a coating operation, the α-ω difunctional species suitable for the practice of the invention with the polymer to be coated onto the surface of the metal. Contacting can be accomplished by methods known in the art, including dissolution in a solvent, melt compounding, or dispersion in a liquid medium to form a mixture. When employing this alternative embodiment of the invention, moiety a of the α-ω difunctional species suitable for the practice of the invention must be a stronger acid than the polymer with which it is contacted.

The first derivatized surface of the present invention provides a selective improvement in the adhereability of organic species to metal surfaces over that achieved with the metal surfaces alone, the selectivity being determined by the functional group of the free end of the α-ω difunctional species of the invention. The second derivatized surface of the invention provides particularly high receptivity to the surface towards acid-containing species. The third derivatized surface of the invention provides surprising durability. The fourth derivatized surface of the invention provides durable modification of the surface energy and reactivity of metal substrates.

EXAMPLES

In the descriptions of the following examples, the underlying terms will be defined as follows:

"stainless steel coupons" means a piece of type 304 stainless steel of nominal dimensions 1"×1"×1/16"

"Nochromix® cleaned" means a dip in a solution of Nochromix® (Godax Laboratories) glass cleaning powder dissolved in sulfuric acid for not less than one minute, followed by a rinse with distilled water "DBPA" means 1, 12 dodecyl bisphosphonic acid "F-DBPA" means 1H, 1H, 12H, 12H-perfluoro-1,12 dodecanediphosphate "IR" means infrared spectroscopy, performed with p-polarized radiation at grazing incidence (86°) to the sample. Quantitative and qualitative information regarding mass coverage and reactions of the organometallic layers are obtained by measurements of characteristic absorption bands, as described in Yang et al, *J. Am. Chem. Soc.* 1993, 115, 11855.

"Film formation measured (or confirmed) by IR" means that the presence of the self-assembled layer was confirmed by measurements of characteristic infrared absorption bands. Unless otherwise stated, these bands are the C—H stretching bands found at 2927 and 2852 $cm^{-1}$, and the P—O bands found between 1200–900 $cm^{-1}$.

"ESCA" means Electron Spectroscopy for Chemical Analysis. Surface analysis by ESCA is accomplished by irradiating a sample with monoenergetic soft x-rays and analyzing the energy of the detected electrons. In this case Mg k-alpha x-rays were used. These Photons have limited penetrating power in a solid on the order of 1–10 micrometers. They interact with the atoms in the surface region, causing electrons to be emitted by the photoelectric effect. Typically the electrons emitted are from approximately the top most 100 angstroms. The emitted electrons have measurable kinetic energies from which binding energies can be calculated. Binding energies (B.E.) may be regarded as the energy difference between the initial and final states after the photelectron has left the atom. Variations in the elemental B.E.'s can be used to identify the chemical state of materials being analyzed.

The instrument used was a VG SCIENTIFIC ESCALAB MK II.

Survey spectra (low resolution, maximum signal) were initially run for each sample to identify the elements present. The conditions for these runs were 300 watts x-rays power, 200 electron volts pass energy (eV, P.E.) and a step size of 0.75 eV for each acquired point. Detail spectra (high resolution) were run for each element detected in the survey (same x-ray power, 20 eV P.E., and 0.2 eV step size). The detail spectra are used for quantitation and chemical state identification. Charge corrections to the elemental B.E.'s were done by assuming the lowest B.E. carbon species to be hydrocarbon (C—C bonding). The analysis area was 2 mm×5 mm.

"APA-II" designates a room temperature soluble copolymer of tetrafluoroethylene (80.7%) and hexafluoropropylene (19.3%), with carboxylic acid end groups synthesized as described in U.S. Pat. No. 5,547,761 and having a melt viscosity of 1200 Pa s (measured at 372° C., $4.48 \times 10^4$ Pa shear stress in a melt indexer). For further details on the properties of soluble fluoropolymers, see U.S. Pat. No. 5,547,761.

The manner of formation of the derivatized surfaces of the present invention hereinbelow described in Examples 1–4 was as follows, unless otherwise stated in the specific embodiments hereinbelow described.

(1) Immersion of the coupon into a 1 mM solution of DBPA in ethanol for 15 minutes at room temperature (ca. 23° C.) to form the first derivatized metal surface;

(2) Removal of the coupon from bath (1) and rinsing with ethanol;

(3) Immersion of the first derivatized metal surface coupon into a 1 mM solution of zinc acetate in ethanol for 15 minutes at room temperature to form the second derivatized metal surface; and (4) Removal of the coupon from bath (3) and rinsing with ethanol.

Contact angles were measured using the Direct Observation-Tangent Method as outlined by Wu (Wu, Souheng, "Polymer Interface and Adhesion", copyright 1982, Marcel Dekker, Inc.). Measurements were performed using a Rame-Hart contact angle goniometer, model number 100-000-115.

Example 1

This example describes formation of a fourth derivatized metal surface. A stainless steel coupon was Nochromix®-cleaned. Steps 1–4 were performed a total of six cycles. IR measurements performed after each step (2) and (4), indicated that the mass deposited was proportional to the number of cycles. The advancing contact angle of water was measured at 64°. Then, the coupon was dipped in a 1 mM solution of octadecylphosphonic acid ("ODPA") in ethanol for fifteen minutes, then removed and rinsed with ethanol, the resulting surface exhibiting an advancing contact angle for water of 132°. Stainless steel cleaned by immersion in Nochromix® and rinsed shows a contact angle of 0°.

Example 2

A stainless steel coupon was Nochromix® cleaned. Steps 1–4 were performed a total of three times. The resulting coupons were immersed in a 0.1 weight percent solution of "APA-II" in perfluorotetradecahydrophenanthrene solvent, at a temperature of 50° C. for one hour. Binding of the fluoropolymer end group to the pendant metal was confirmed by IR spectroscopy, specifically the appearance of the $-CF_2CO_2-$ anion at 1687 cm$^{-1}$.

Example 3

Steps 1–4 were repeated 3 times using a Nochromix-cleaned stainless steel coupon. A TFE/HFP copolymer (11.4 weight percent hexafluoropropylene), containing carboxylic acid end groups, with an average chain length of ca. 770 carbon atoms, was melt pressed onto the coupon at 270° C., under 250 psi pressure for 30 seconds. The film was then carefully stripped from the coupon using a razor blade, and examined by IR. The binding of the fluorocarbon chains to the layer was confirmed by the presence of the $-CF_2CO_2-$ anion at 1687 cm$^{-1}$.

Example 4

Steps 1–4 were performed on a Nochromixo-cleaned stainless steel coupon, with the modification that aluminum nitrate was used in step 3 in place of zinc acetate, and the exposure conditions in step 1 and 3 were 60 minutes at 50° C. IR measurements confirmed formation of the DBPA/Al complex.

Examples 5–8

Nochromix® cleaned stainless steel coupons were treated as follows:

(1) dipped in an aqueous solution of DBPA/0.5 equivalent NaOH for 15 minutes at room temperature, and then rinsed with water.

(2) dipped in the 5 mM aqueous solutions of metal salts shown in Table A at 23° C. for 30 minutes, then removed and rinsed with water.

Steps (1) and (2) were performed a total of 3 times.

TABLE A

| | |
|---|---|
| Example 5 | —$Mn^{+2}$, from manganese acetate |
| Example 6 | —$Mg^{+2}$, from magnesium acetate |
| Example 7 | —$Ni^{+2}$, from nickel (II) acetate |
| Example 8 | —$Pb^{+2}$, from lead (II) acetate |

IR measurements confirmed the formation of the DBPA/metal complexes involving the respective metals in Table A.

Example 9

Nochromix® cleaned stainless steel coupons were treated as follows:

(1) dipped in an aqueous solution of DBPA/0.5 equivalent NaOH for 15 minutes at room temperature, and then rinsed with water.

(2) dipped in the 5 mM aqueous solutions of $ZrOCl_2$ at 23° C. for 30 minutes, then removed and rinsed with water.

Steps (1) and (2) were performed a total of 3 times. IR measurements confirmed the formation of the DBPA/Zr complex on the surface of the coupon.

Examples 10–13

Nochromix® cleaned stainless steel coupons were used. An identical procedure to that of Examples 5–8 was used, except that the temperatures of the baths were maintained at 90° C. IR spectroscopy revealed increased peak sharpness of the IR C—H and P—O peaks higher integrated absorption intensities and shifts in the peak absorption intensities, as shown in Table B. All these features are thought to correspond to more highly ordered films.

TABLE B

| | | | C-H Peak Location- | |
|---|---|---|---|---|
| Example | Metal ion | C-H Peak Area Ratio (90°/23°) | 23° C. (cm$^{-1}$) | 90° C. (cm$^{-1}$) |
| 10 | $Mn^{+2}$ | 2.3 | 2926 | 2926 |
| 11 | $Mg^{+2}$ | 2.3 | 2932 | 2926 |
| 12 | $Ni^{+2}$ | 1.8 | 2932 | 2926 |
| 13 | $Pb^{+2}$ | 2.9 | 2926 | 2926 |

Example 14

A ca. 1000 ppm mixture of DBPA in SURLYN® 1702, a zinc-neutralized ionomer formed from ethylene and methacrylic acid available from DuPont was made by melt blending in an extruder. Pellets of Surlyn® 1702 were first ground into a powder, dry mixed with DBPA powder by stirring, then fed to a laboratory annular extruder (Custom Scientific Instruments, Inc., Mixing Extruder CS 194A) with a barrel and die temperature of 190° C. The extruded composition was laminated to aluminum coupons in a press at 150° C. under 100 psi pressure for 30 seconds, then annealed at 150° C. in a nitrogen purged vacuum oven for various lengths of time from 30 seconds to ca. 20 hours. The material was peeled and scraped off of the aluminum with a razor blade, and the coupons examined with IR. The presence of the DBPA on the surface was indicated by the P—O peaks at ca. 1112 and 1044 $cm^{-1}$.

Examples 15 to 56 and Comparative Examples 1–30

In the following examples, composite structures were formed of metal panels, α-ω bis phosphonic acids, and NUCREL® ethylene/methacrylic acid copolymer film, available from DuPont. The composites so formed were subject to exposure to the various corrosive exposures as hereinbelow described, and the durability of the composite was evaluated. The panels of aluminum were 4"×12"×0.025" and those of cold rolled steel, ("CRS"—4"×12"×0.032"). Both were obtained from ACT Laboratories, Hillsdale, Mich. The aluminum was Code APR10324, batch # 30907514. The CRS was Code APR 10354, batch# 31002514. All panels were cleaned with a methylene chloride rinse prior to treatment. The concentration of all the treatment baths used was 1 mM, and the time of immersion in all the baths was 30 minutes. Treatment was effected by first immersing the cleaned metal panel in a bath of the indicated bisphosphonic acid, then withdrawing it and rinsing with a pure solvent identical to the bath solvent. Where indicated, the panel was subsequently immersed in a bath of metal salt solution, then removed and rinsed again.

Films of NUCREL® 0403HC (poly(ethylene-co-methacrylic acid), 4 weight percent acid comonomer content, 0.002" in thickness were then laminated to the metal panels by heating the metal panels on a hot plate to 80° C., then placing sheets of the polymer onto the panel and rolling the sheet flat with a rubber roller. Once all the panels had been so laminated, they were placed together into a 150° C., nitrogen purged vacuum oven for 15 minutes. They were then removed together and stored at room temperature. A control sample was also prepared by laminating the NUCREL® film to the Nochromix®-cleaned metal plate without having further treated the metal plate prior to lamination.

After aging for ca. four weeks, these panels were sheared into test plaques of dimension ca. 4"×1". The edges were sealed with silicone caulk and a groove cut in the center using a carbide tipped tool, following the procedures of ASTM D 1654-92. The panels were then immersed in baths of compositions indicated in the specific examples hereinbelow for the periods indicated therein. Upon removal, the extent of delamination of the metal/polymer interface was evaluated by imaging the panel with an optical scanner (UMAX model "PowerLook") and using a computer program (NIH Image, version 1.6, available from the National Institutes of Health, Bethesda, Md.) to quantify the area. In some cases where contrast between the delaminated and laminated areas was poor, the area was measured by outlining the delaminated area on the image with a pen, cutting out that area with scissors, and weighing it on an analytical balance.

Table I describes the preparation of the metal panels. The "carbon number" denotes the number of carbon atoms in the aliphatic chain hereinabove described.

TABLE 1

Aluminum Panel Treatments: Ethanol Solvent at 50° C. Zinc Acetate/ethanol Post-Treatment

| Specimen # | Carbon Number | |
|---|---|---|
| A1 | 2 | |
| A2 | 4 | |
| A3 | 6 | |
| A4 | 8 | |
| A5 | 10 | |
| A6 | 12 | |
| A7 | 12 | No Zinc Acetate |

TABLE 2

Aluminum Panel Treatments: Water Solvent at 70° C. Zinc Acetate/water Post-Treatment

| Specimen # | Carbon Number | |
|---|---|---|
| A8 | 2 | |
| A9 | 4 | |
| A10 | 6 | |
| A11 | 8 | |
| A12 | 10 | |
| A13 | 12 | 0.5 Eq. aqueous NaOH |
| A14 | 12 | • 0.5 Eq. aqueous NaOH<br>• No Zinc Acetate Post-Treatment |
| A15 | 12 | • 0.5 Eq. aqueous NaOH<br>• Aqueous Aluminum Nitrate Post-Treatment |
| A16 | 12 | • 0.5 Eq. aqueous NaOH<br>• Aqueous lead acetate post-treatment |

TABLE 3

Cold Rolled Steel Panel Treatments: Ethanol Solvent at 50° C. Zinc Acetate/ethanol Post-treatment

| Specimen # | Carbon Number | |
|---|---|---|
| S1 | 2 | |
| S2 | 4 | |
| S3 | 6 | |
| S4 | 8 | |
| S5 | 10 | |
| S6 | 12 | |
| S7 | 12 | No Zinc Acetate Post-treatment |

The panels so formed were subjected to the following battery of tests:

Examples 15–18 and Comparative Examples 1–4

Cold rolled steel panels prepared as above were in a $1.7 \times 10^{-3}$ M solution of NaCl in water at 23° C. for 22 hours. The extent of delamination of the panels was as shown in Table 4.

TABLE 4

Cold Rolled Steel in aqueous NaCl for 22 hours

| | Specimen # | delaminated area (in$^2$) |
|---|---|---|
| Comparative Example 1 | Control | 0.20 |
| Comparative Example 2 | S1 | 1.58 |
| Comparative Example 3 | S2 | 2.21 |
| Comparative Example 4 | S3 | 2.64 |
| Example 15 | S4 | 1.38 |
| Example 16 | S5 | 1.14 |
| Example 17 | S6 | 0.09 |
| Example 18 | S7 | 0.44 |

The specimens were replaced in the NaCl bath and held for an additional 32.5 hours for a total exposure time of 54.5 hours. It was found that all specimens had completely delaminated except for the untreated control and the 12 carbon chain length treated samples S6 and S7 which exhibited delaminated areas of, respectively, 1.05 in$^2$, 0.10 in$^2$, and 2.04 in$^2$.

Examples 19–22 and Comparative Examples 5–8

Cold rolled steel panels were immersed in a 1.1×10$^{-3}$ M CaCl$_2$/water solution at 23° C. for ca. 273 hours. No delamination of any of the panels was noted. The panels were then immersed in a 5% (weight) HCl/water bath for 1 hour, 45 min. The images of the panels were recorded, and the extent of delamination determined by printing the image, outlining the delaminated area with marker, then cutting out the delineated area and weighing. The extent of delamination of panels is provided in Table 5.

TABLE 5

Cold rolled steel in HCl

| | Specimen # | delaminated area (in$^2$) |
|---|---|---|
| Comparative Example 5 | Control | 1.22 |
| Comparative Example 6 | S1 | 2.83 |
| Comparative Example 7 | S2 | 1.85 |
| Comparative Example 8 | S3 | 2.15 |
| Example 19 | S4 | 1.77 |
| Example 20 | S5 | 1.76 |
| Example 21 | S6 | 0.313 |
| Example 22 | S7 | 0.522 |

Examples 23–29 and Comparative Examples 9–12

Aluminum panels were immersed in lemon juice for ca. 3 weeks at 23° C. The extent of delamination was as shown in Table 6.

TABLE 6

Aluminum in lemon juice

| | Specimen # | delaminated area (in$^2$) |
|---|---|---|
| Comparative Example 9 | Control | 0.14 |
| Comparative Example 10 | A1 | 4.2 |
| Comparative Example 11 | A2 | 4.2 |
| Comparative Example 12 | A3 | 0.31 |
| Example 23 | A4 | 0.15 |
| Example 24 | A5 | 0.073 |
| Example 25 | A6 | 1.35 |
| Example 26 | A7 | 0.18 |

TABLE 6-continued

Aluminum in lemon juice

| | Specimen # | delaminated area (in$^2$) |
|---|---|---|
| Example 27 | A14 | 0.23 |
| Example 28 | A15 | 0.02 |
| Example 29 | A16 | 0.02 |

Examples 30–36 and Comparative Examples 13–16

Aluminum panels were immersed in orange juice at room temperature for ca. 3 weeks. The extent of delamination was as shown in Table 7.

TABLE 7

Aluminum in orange juice

| | Specimen # | delaminated area (in$^2$) |
|---|---|---|
| Comparative Example 13 | Control | 0.06 |
| Comparative Example 14 | A1 | 4.03 |
| Comparative Example 15 | A2 | 2.2 |
| Comparative Example 16 | A3 | 0.27 |
| Example 30 | A4 | 0.11 |
| Example 31 | A5 | 0.08 |
| Example 32 | A6 | 0.11 |
| Example 33 | A7 | 0.08 |
| Example 34 | A14 | 0.23 |
| Example 35 | A15 | 0.04 |
| Example 36 | A16 | 0.07 |

Due to the very slow rate of delamination, the small areas are subject to considerable uncertainty.

Examples 37–42 and Comparative Examples 17–20

Aluminum panels were immersed in water for 13 days. No delamination of any of the panels was noted. The panels were then immersed in a 1.5 M HCl/water bath for a total of 2 hours, 40 minutes. The delaminated areas were found to be as shown in Table 8.

TABLE 8

Aluminum in HCl

| | Specimen # | delaminated area (in$^2$) |
|---|---|---|
| Comparative Example 17 | Control | 0.12 |
| Comparative Example 18 | A1 | 2.13 |
| Comparative Example 19 | A2 | 1.18 |
| Comparative Example 20 | A3 | 0.66 |
| Example 37 | A4 | 0.25 |
| Example 38 | A5 | 0.04 |
| Example 39 | A6 | 0.08 |
| Example 40 | A7 | 0.11 |
| Example 41 | A15 | 0.07 |
| Example 42 | A16 | 0.07 |

Examples 43–45 and Comparative Examples 21–23

Aluminum panels were placed in a 10% (volume) acetic acid/water bath for 18 days. Results are shown in Table 9.

TABLE 9

Aluminum in acetic acid

| | Specimen # | delaminated area (in$^2$) |
|---|---|---|
| Comparative Example 21 | A8 | 0.25 |
| Comparative Example 22 | A9 | 0.39 |
| Comparative Example 23 | A10 | 1.37 |
| Example 43 | A11 | 1.10 |
| Example 44 | A12 | 0.10 |
| Example 45 | A13 | 0.07 |

Examples 46–55 and Comparative Examples 24–30

Aluminum in HCl/water. This experiment is a side-by-side comparison of preparation methods, using self-assembled monolayers deposited from ethanol and water. Panels of type A1–A16 were utilized. These were immersed in a 1.5 M HCl/water bath for 12 hrs, 25 minutes. Results are shown in Table 10.

TABLE 10

Aluminum in HCl

| | Specimen # | delaminated area (in$^2$) |
|---|---|---|
| Comparative Example 24 | Control | 0.18 |
| Comparative Example 25 | A1 | 3.50 |
| Comparative Example 26 | A8 | 0.38 |
| Comparative Example 27 | A2 | 3.50 |
| Comparative Example 28 | A9 | 1.20 |
| Comparative Example 29 | A3 | 1.31 |
| Comparative Example 30 | A10 | 0.65 |
| Example 46 | A4 | 0.28 |
| Example 47 | A11 | 0.29 |
| Example 48 | A5 | 0.14 |
| Example 49 | A12 | 0.10 |
| Example 50 | A6 | 0.10 |
| Example 51 | A13 | 0.10 |
| Example 52 | A7 | 0.20 |
| Example 53 | A14 | 0.16 |
| Example 54 | A15 | 0.10 |
| Example 55 | A16 | 0.10 |

Example 56 and Comparative Example 31

An aluminum panel was rinsed with methylene chloride and immersed at room temperature in a bath of a 1 mM aqueous solution of 1,12 dodecyl bisphosphonic acid under the conditions hereinabove described. After removal and rinsing, it was then immersed in a 2 mM aqueous solution of zinc acetate. Using a doctor knife, films of FEP "APA-II" were prepared by casting at 100° C. a five percent by weight solution of the polymer in perfluorodecahydrophenanthrene solvent onto a glass plate. The cast films were dried in a vacuum oven at 150° C. Final film thicknesses were ca. 0.05 mm.

The treated aluminum panel, and a methylene chloride-rinsed, untreated control were laminated with the FEP film at a temperature of 130° C. by placing the film atop the panel and rolling smooth with a rubber roller. The laminates were then placed in a vacuum oven at 160° C., and the oven turned off and allowed to cool overnight. The panels were removed and stored at room temperature. After six days of aging, the panels were cut into test plaques ca. 1"×4". Edges were sealed with silicone caulk and a groove scribed after ASTM 1654-92.

One DBPA-treated and one untreated control panel were immersed in a solution of 1.5 M HCl/water for a total of 21 hours at room temperature. The delaminated areas were found to be 0.12 in$^2$ for the control and 0.048 in$^2$ for the DBPA-treated panel.

Examples 57–61 and Comparatives Examples 32–35

In the following examples, composite structures were formed of aluminum panels as hereinabove described; fluorinated α-ω bisphosphates of the formula $H_2O_3P$—O—$CH_2$—$(CF_2)_n$—$CH_2$—O—$PO_3H_2$, wherein n=2, 6, 10 (as prepared below), and DBPA; and APAII copolymer film, as hereinabove described, available from DuPont. The composites so formed were subject to the corrosive exposures as hereinbelow described, and the durability of the composite was evaluated.

The fluorinated α-ω bisphosphates were prepared as follows: Preparation of $(CF_2)_6$—$(CH_2OP(O)(OH)_2)_2$ $(CF_2)_6$—$(CH_2OH)_2$+$POCl_3$/cat. $CaCl_2$→$(CF_2)_6$—$(CH_2OP(O)Cl_2)_2$ $(CF_2)_6$—$(CH_2OP(O)Cl_2)_2$+$H_2O$→$(CF_2)_6$—$(CH_2OP(O)(OH)_2)_2$ A mixture of dodecafluorohexane-1,12-diol (10.86 g, 0.03 mol), phosphorus oxychloride (77 g, 0.5 mol) and calcium chloride (1.2 g, 0.0108 mol) was stirred vigorously at 100–110° C. for overnight. After cooling, the product mixture was filtered to remove any salt residue. The excess phosphorus oxychloride was distilled off at ~36° C./50 mmHg. After high vacuum treatment (80° C./2 hrs), the cooled product was washed with ether and dried to give the desired bis-(phosphorodichloridate) as a white solid, mp. 59–60° C., yield 17.5 g (98%). $^1$H NMR (300 MHz, $CDCl_3$): δ4.72 (q, J=12 Hz); $^{19}$F NMR (188.24 MHz, $CDCl_3$):−120.3 (m, 4F), 122.4 (m, br, 4F), −123.4 (m, br, 4F).

The bis-(phosphorodichloridate) product obtained from the above experiment (17.4 g, 0.029 mol) was dissolved in tetrahydrofuran (THF, 25 mL), then water (3.1 g, 0.172 mol) was added slowly. After addition was complete, the mixture was heated at reflux for 3 hrs. The THF solvent was removed in vacuo and the residue was dried at 100° C. under high vacuum. After cooling, ether was added to extract the product. The bottom organic layer was separated and the ether was removed in vacuo. The solid residue was dried to give the bis-(phosphoric acid) product as a white solid, mp. 200° C. (decomp.), yield 10.3 g (67.6%). $^1$H NMR (300 MHz, $CDCl_3$): δ4.44 (m, 4H), 10.6 (s, br, 4H); $^{19}$F NMR (188.24 MHz, $CDCl_3$):−118.3 (s, 4F), −119.6 (s, 4F), −120.7 (s, 4F). Preparation of $(CF_2)_2$—$(CH_2OP(O)(OH)_2)_2$ $(CF_2)_2$—$(CH_2OH)_2$+$POCl_3$/cat. $CaCl_2$→$(CF_2)_2$—$(CH_2OP(O)Cl_2)_2$$(CF_2)_2$—$(CH_2OP(O)Cl_2)_2$+$H_2O$→$(CF_2)_2$—$(CH_2OP(O)(OH)_2)_2$ The bis-(phosphorodichloridate) $(CF_2)_2$—$(CH_2OP(O)Cl_2)_2$ was prepared from tetrafluoro-1,4-butanediol by the same procedure described in the above preparation. This product was a white solid, mp. 61–65° C. $^1$H NMR (300 MHz, $CDCl_3$): δ4.48 (m, 4H), 10.6 (s, br, 4H); $^{19}$F NMR (188.24 MHz, $CDCl_3$):−127.7 (dm, J=48.5 Hz).

The bis-(phosphoric acid) product $(CF_2)_2$—$(CH_2OP(O)(OH)_2)_2$ was prepared from $(CF_2)_2$—$(CH_2OP(O)Cl_2)_2$ by the procedure described above. The product was a white powdered solid, mp. 160–168° C. $^1$H NMR (300 MHz, $CDCl_3$): δ4.16 (m); $^{19}$F NMR (188.24 MHz, $CDCl_3$): −125.5 (m). Preparation of $(CF_2)_{10}$—$(CH_2OP(O)(OH)_2)_2$ $(CF_2)_{10}$—$(CH_2OH)_2$+$POCl_3$/cat. $CaCl_2$→$(CF_2)_{10}$—$(CH_2OP(O)Cl_2)_2$$(CF_2)_{10}$—$(CH_2OP(O)Cl_2)_2$+$H_2O$→$(CF_2)_{10}$—$(CH_2OP(O)(OH)_2)_2$ A mixture of eicosafluorododecane-1,12-diol (26.5 g, 0.047 mol), phosphorus oxychloride (120 g, 0.78 mol) and calcium chloride (1.7 g, 0.015 mol) was stirred vigorously at 100–110° C. for overnight. After cooling the product mixture was solidified. This mixture was warmed slightly and the solid was melted into a liquid, which was filtered to remove any residual salt. The excess phosphorus oxychloride was distilled off at ~36° C./50 mmHg. The product bis-(phosphorodichloridate) was obtained as a white solid after vacuum drying, mp. 111–113° C., yield 34 g (90.6%). $^1$H NMR (300 MHz, CDCl$_3$): δ4.73 (m); $^{19}$F NMR (188.24 MHz, CDCl$_3$): –120.3 (br, 4F), –122.2 (s, br, 12F), –123.3 (s, br, 4F).

The bis-(phosphorodichloridate) product obtained from the above experiment (34 g, 0.0427 mol) was dissolved in tetrahydrofuran (THF, 50 mL) at 50° C., then water (3.08 g, 0.171 mol) was added slowly while keeping the pot temperature at ~50 to 60° C. After addition the mixture was heated at reflux for 3 hrs. The THF solvent was removed under vacuum and the residual solid was dried at 60° C. under high vacuum to give the bis-(phosphoric acid) product as a white solid, mp. 180–190° C., yield 28.7 g (93.1%). This product had very low solubility in various organic solvents, therefore the NMR spectrum data could not be obtained.

Durability Evaluation

All panels were cleaned with a methylene chloride rinse prior to treatment by immersing for one hour at room temperature into 1 millimolar solutions of the bis-functional species in water having dissolved therein one molecule equivalent of ammonium hydroxide. Following this, the panels were rinsed with water and immersed in a 2 millimolar solution of zinc acetate in water, at room temperature, for one hour.

The panels so treated were laminated with films of the TFE/HFP copolymer APA-II hereinabove described. Prior to lamination, the films were prepared from a 5% solution of the polymer in perfluorotetradecahydrophenanthrene by casting onto glass plates, followed by evaporation of the solvent. The resultant films, ca. 0.05 mm in thickness, were peeled from the plates and laminated to the aluminum panels at a temperature of 130° C. They were then placed side by side in a vacuum oven at 160° C., and the oven turned off to effect slow cooling.

After aging as indicated hereinbelow, the panels were cut into test plaques ca. 1 1×4". Edges were sealed with silicone caulk and a groove scribed according to the method of ASTM 1654-92.

A control sample was also prepared by laminating the APA-II film to the cleaned aluminum plate without having further treated the metal plate prior to lamination.

The panels were then immersed in baths of compositions indicated in the specific examples hereinbelow for the periods indicated therein. Upon removal, the extent of delamination of the metal/polymer interface was evaluated as hereinabove described.

Table 11 describes the preparation of the metal panels. The "carbon number" denotes the number of carbon atoms in the aliphatic or fluoroaliphatic chain hereinabove described.

TABLE 11

Aluminum Panel Treatments: Aqueous NH$_4$OH 23° C.
Zinc Acetate/ethanol Post-Treatment

| Specimen # | Carbon Number | |
|---|---|---|
| A17 | 4 | Fluorophosphate |
| A18 | 8 | Fluorophosphate |

TABLE 11-continued

Aluminum Panel Treatments: Aqueous NH$_4$OH 23° C.
Zinc Acetate/ethanol Post-Treatment

| Specimen # | Carbon Number | |
|---|---|---|
| A19 | 12 | Fluorophosphate |
| A20 | 12 | DBPA |

Examples 56–58 and Comparative Examples 32,33

The panels were aged for one week at room temperature prior to edge sealing. They were then immersed in 1.1 molar aqueous solution of HCl at room temperature for a total of 14 hours. Results are shown in Table 12

TABLE 12

Aluminum Panels in Aqueous HCl

| | Specimen | Delaminated area (in$^2$) |
|---|---|---|
| Comparative Example 32 | Control | 0.48 |
| Comparative Example 33 | A17 | 0.64 |
| Example 56 | A18 | 0.23 |
| Example 57 | A19 | 0.20 |
| Example 58 | A20 | 0.19 |

Examples 59–61 and Comparative Examples 34,35

The panels were aged four weeks at room temperature prior to edge sealing. They were then immersed in a 0.0001 gm/gm solution of NaCl in water for one day. With no evidence of delamination, the concentration was increased to 0.001 gm/gm NaCl/H2O. After five more days of exposure with no delamination noted, the bath temperature was increased to 100° C. Results in Table 13 were obtained after two days of the latter exposure.

TABLE 13

Aluminum Panels in Aqueous NaCl

| | Specimen | Delaminated area (in$^2$) |
|---|---|---|
| Comparative Example 34 | Control | 0.3 |
| Comparative Example 35 | A17 | 1.0 |
| Example 59 | A18 | 0.1 |
| Example 60 | A19 | 0.011 |
| Example 61 | A20 | 0.0095 |

Example 62

Self Assembly on Tantalum Surface Formation of Monolayer from Ethanol Solution

A six inch silicon wafer coated with tantalum metal was obtained from Hewlett-Packard, Corvallis, Oreg. The wafer was cut into coupons ca. 1 in×1 in. in dimension. These were cleaned with Nochromix®/H$_2$SO$_4$ solution by dipping for 3 min. Each coupon was dipped in a ca. 1 millimolar solution of 1, 12 dodecylbisphosphonic acid (C$_{12}$BPA) in ethanol for a total of 15 min, then removed, rinsed with clean ethanol, and allowed to dry. Formation of a monolayer of C$_{12}$BPA was confirmed by infrared analysis.

Formation of Multilayers

A coupon of tantalum on silicon was dipped for 15 min in a ca. 1 millimolar solution of C$_{12}$ BPA in ethanol, rinsed, then dipped in a ca. 2 millimolar solution of aluminum nitrate in water, then rinsed. The coupon was scanned using infrared techniques. This procedure was repeated on the coupon three more times. The infrared analysis confirmed stepwise multilayer deposition of a $C_{12}$BPA/aluminum complex.

Formation of Monolayer from Aqueous Solution

A 0.46 millimolar solution of 1,16 hexadecylbisphosphonic acid ($C_{16}$BPA) in water was made by neutralization with sodium hydroxide. A coupon of tantalum on silicon was immersed in this solution for ca. 15 min, then removed and rinsed with water. Formation of the monolayer of $C_{16}$BPA was confirmed by IR analysis.

What is claimed is:

1. A process for producing a derivatized metal surface, comprising: contacting a metal surface with an α-ω difunctional substantially linear fluoroaliphatic acid, or a univalent salt thereof, having 8 to less than 30 carbon linkages in the fluoroaliphatic chain to produce a first derivatized metal surface.

2. The process of claim 1 wherein the α-ω difunctional substantially linear fluoroaliphatic acid or univalent salt thereof is a bis-oxyacid of phosphorus or a univalent salt thereof.

3. The process of claim 2 wherein the bis-oxyacid of phosphorus or univalent salt thereof is a fluoro bisphosphate or a univalent salt thereof.

4. The process of claim 1 wherein the metal is selected from the group consisting of iron, chromium, aluminum, copper, nickel, zinc, titanium, tin, tantalum, steel, stainless steel, brass, inconel, and phosphated metals.

5. The process of claim 1 further comprising contacting said first derivatized metal surface with a liquid comprising a polymer having a functional group associative with said first derivatized metal surface to produce a third derivatized metal surface.

6. The process of claim 1 further comprising, contacting said first derivatized metal surface with a non-polymeric molecular species having a functional group associative with said first derivatized metal surface to produce a fourth derivatized metal surface.

7. A process for producing a derivatized metal surface, comprising:

contacting a metal surface, wherein the metal is selected from the group consisting of iron, chromium, aluminum, copper, nickel, zinc, titanium, tin, tantalum, steel, stainless steel, brass, inconel, and phosphated metals, with an α-ω difunctional substantially linear aliphatic or fluoroaliphatic acid or univalent salt thereof, wherein said aliphatic or fluoroaliphatic acid or univalent salt thereof is a bis-oxyacid of phosphorus or univalent salt thereof having 8 to less than 30 carbons in the linear chain between the bis-oxyacids or univalent salt thereof, to produce a first derivatized metal surface; and contacting said first derivatized metal surface with a solution comprising a multivalent metal salt to produce a second derivatized metal surface.

8. The process of claim 7 wherein the bis-oxyacid of phosphorus or univalent salt thereof is a bisphosphonic acid or univalent salt thereof.

9. The process of claim 7 wherein the bis-oxyacid of phosphorus or univalent salt thereof is a fluoro bisphosphate or univalent salt thereof.

10. The process of claim 7 further comprising contacting said second derivatized metal surface with a polymer having a functional group associative with said second derivatized metal surface to produce a third derivatized metal surface.

11. The process of claim 10 wherein the bis-oxyacid of phosphorus or univalent salt thereof is a bisphosphonic acid or univalent salt thereof.

12. The process of claim 10 wherein the bis-oxyacid of phosphorus or univalent salt thereof is a fluoro bisphosphate or univalent salt thereof.

13. The process of claims 5 or 10 wherein the polymer has an oxyacid or salt thereof functionality, an amine functionality, an anhydride functionality, or is a polyimide.

14. The process of claim 13 wherein the metal is tantalum and the polymer is a polyimide.

15. The process of claim 7 further comprising contacting said second derivatized metal surface with a non-polymeric molecular species having a functional group associative with said second derivatized metal surface to produce a fourth derivatized metal surface.

16. The process of claim 15 wherein the bis-oxyacid of phosphorus or a univalent salt thereof is a bisphosphonic acid or univalent salt thereof.

17. The process of claim 15 wherein the bis-oxyacid of phosphorus or univalent salt thereof is a fluoro bisphosphate or univalent salt thereof.

18. The process of claim 7 wherein the metal of the salt is selected from the group consisting of Zr, Zn, Pb, Al, Cr, Fe, Ni, Co, V, Sn, Os, Ce, Y, Yb, La, Mn, Mg, Cu and Ca, and the solvent is water or ethanol.

19. The process of claim 18 wherein the solution is an aqueous solution of zinc acetate.

20. A process for applying a polymer coating onto a surface of a metal substrate, comprising: contacting an α-ω difunctional substantially linear fluoroaliphatic acid or univalent salt thereof having 8 to less than 30 carbon linkages in the fluoroaliphatic chain with a liquid comprising a polymer having a functional group associative with said difunctional acid or salt thereof to form a mixture; and coating the mixture onto a surface of a metal substrate.

21. The process of claim 20 further comprising the step of drying the coated mixture.

22. A layered structure, comprising:

a first layer comprising a substrate having a surface, said substrate comprising a metal and a plurality of cations thereof on the surface; and, a second layer comprising an α-ω difunctional substantially linear fluoroaliphatic bidentate radical having 8 to less than 30 carbon linkages in the fluoroaliphatic chain, the radical having a first end and a second end, said first end being bonded to an anion of an oxy-acid of phosphorous or carbon, said anion being ionically bonded to the metal cations on the surface of said substrate, and said second end being bonded to a functional group.

23. A layered structure, comprising:

a first layer comprising a substrate having a surface, said substrate comprising a metal and a plurality of cations thereof on the surface, wherein said metal is selected from the group consisting of iron, chromium, aluminum, copper, nickel, zinc, titanium, tin, tantalum, steel, stainless steel, brass, inconel, and phosphated metals;

a second layer comprising an α-ω difunctional substantially linear fluoroaliphatic bidentate radical having 8 to less than 30 carbon linkages in the fluoroaliphatic chain, the radical having a first end and a second end, said first end being bonded to an anion of an oxy-acid of phosphorus, or carbon, said anion being ionically bonded to the metal cations on the surface of said substrate, and said second end being bonded to a functional group selected from the group consisting of radicals of oxyacids of phosphorous, carbon, and salts of a counterion or cation thereof; primary, secondary, tertiary or quaternary amines and salts thereof; phenol; oxamic acid; amino acid; and carbon and sulfur zwitterion; and a multivalent metallic salt derivative ionically bonded to said functional group or to a derivative of said functional group.

24. The layered structure of claim 22 further comprising an organic species associative with said functional group or to a derivative of said functional group.

25. The layered structure of claim 23 further comprising an organic species associative with said multivalent metallic salt derivative or to an ion of said multivalent metallic salt derivative.

26. The layered structure of claim 23 wherein the first end is bonded to a first phosphonate radical and the second end is bonded to a second phosphonate radical, said first and second phosphonate radicals being the same or different.

27. The layered structure of claims 22 or 23 wherein the first end is bonded to a first fluorophosphate radical and the second end is bonded to a second fluorophosphate radical, said first and second fluorophosphate radicals being the same or different.

28. The layered structure of claims 24 or 25 wherein the organic species is a polymeric species, said polymeric species forming a third layer.

29. The layered structure of claim 28 wherein the organic species is an acid anion of an acid-containing polymer.

30. The layered structure of claim 28 wherein the polymer is a polyimide and the metal is tantalum.

31. The layered structure of claims 24 or 25 wherein the organic species is a non-polymeric molecular species.

32. A composition, comprising: an $\alpha$-$\omega$ difunctional substantially linear fluoroaliphatic acid or a univalent salt thereof having 8 to less than 30 carbon linkages in the fluoroaliphatic chain; and a polymer having a functional group associated with said acid or salt thereof.

* * * * *